United States Patent [19]
Van Gilst

[11] Patent Number: 5,437,244
[45] Date of Patent: Aug. 1, 1995

[54] BALL FLOAT FOR A WATERING TANK

[75] Inventor: Carl Van Gilst, Goshen, Ind.

[73] Assignee: Agri-Engineering, Inc., Goshen, Ind.

[21] Appl. No.: 760,154

[22] Filed: Sep. 16, 1991

[51] Int. Cl.⁶ .............................................. A01K 7/00
[52] U.S. Cl. ....................................... 119/73; 119/72
[58] Field of Search ...................................... 119/72, 73

[56] References Cited

U.S. PATENT DOCUMENTS 3,943,889 3/1976 Sparber ................................ 119/73
4,559,905 12/1985 Ahrens ................................. 119/73

Primary Examiner—John G. Weiss
Attorney, Agent, or Firm—Baker & Daniels

[57] ABSTRACT

The livestock watering tank includes a top, bottom and sidewall. The top wall has an opening for access to the water. The opening is closed by a float. The animal drinks by pushing the float down into the water with its mouth, causing the float to partially submerge so that water is exposed and may be drunk. The float rises back to its natural position after the animal finishes drinking. The float has a port for allowing water or other weighted substance to be introduced into it. The addition of the substance into the float generally neutralizes the buoyancy of the float with respect to the water in the tank, thereby decreasing the amount of force necessary for the animal to submerge the float for drinking.

7 Claims, 3 Drawing Sheets

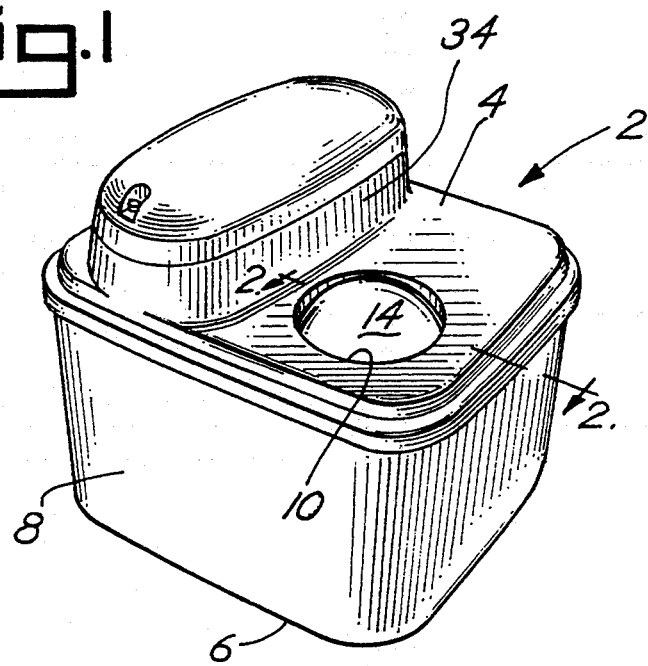
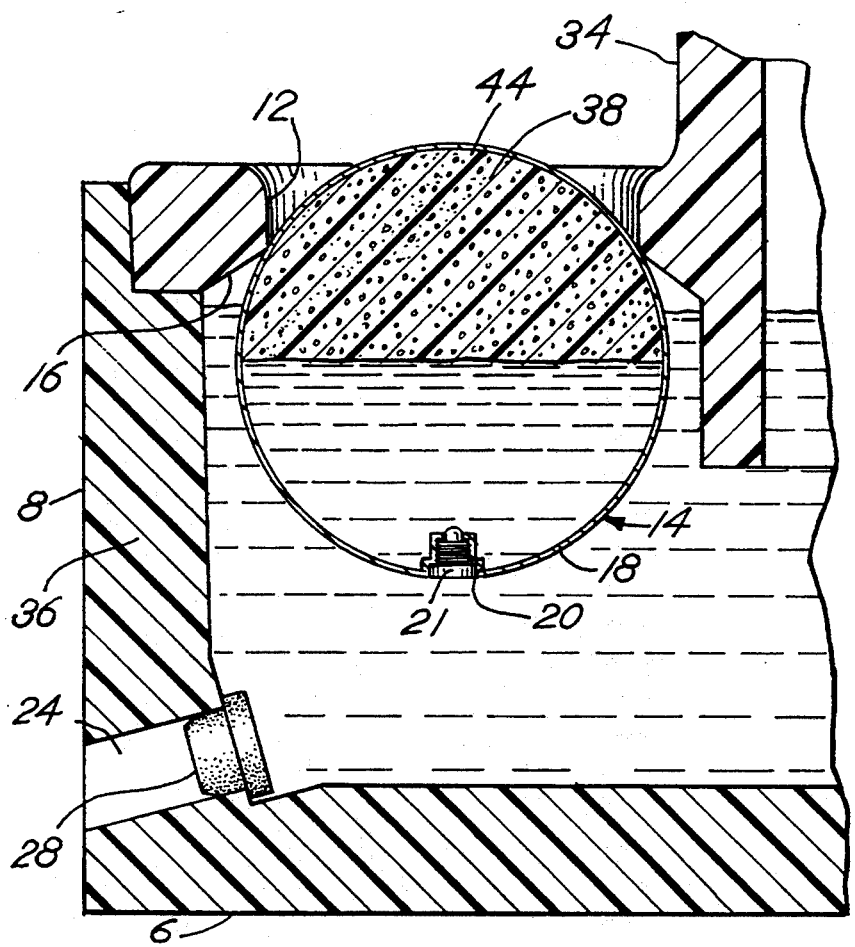

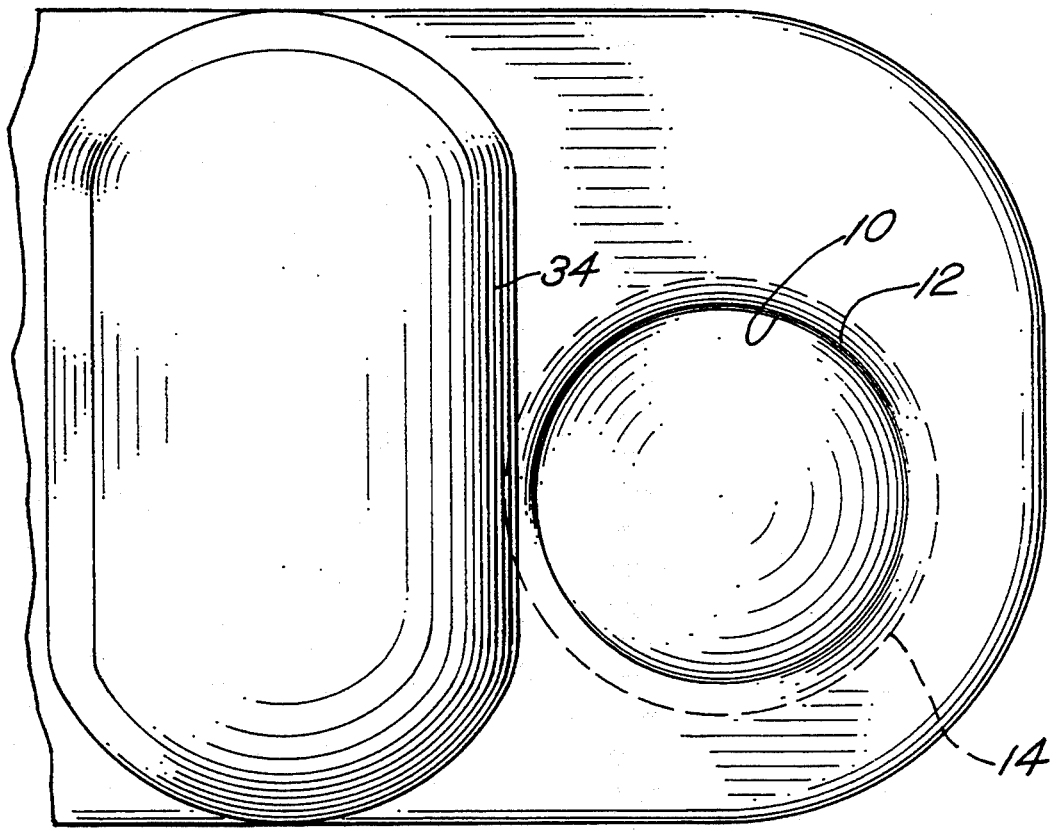
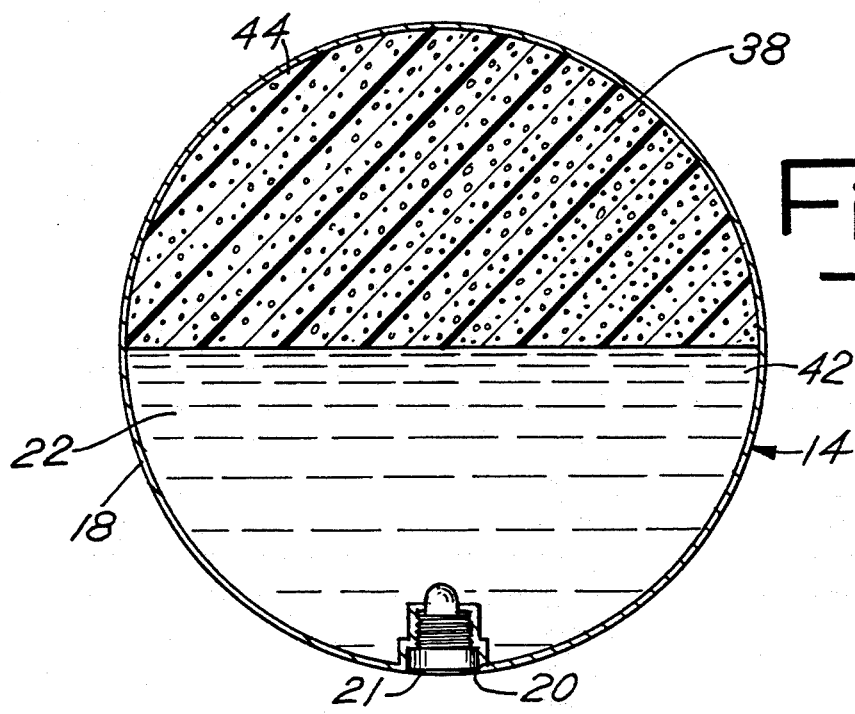

BALL FLOAT FOR A WATERING TANK

This invention relates to a livestock watering tank. Some current livestock watering tanks use buoyant floats to close the opening in the tank so that the water in the tank is thermally sealed from the subfreezing outside air. However, these floats have a high buoyancy and hence require the animal to exert and maintain considerable force on the float to submerge it. Some water tanks include a spherical float with converging tracks installed on the side walls to permit the float to roll transversely away from the opening in response to a downward force applied by the head of an animal seeking a drink of water. For such a tank see U.S. Pat. No. 4,559,905. The animal would only have to apply the initial force to roll the float away from the opening. However, this initial force is still considerable and the installation of the converging tracks adds to the cost of the water tank.

Therefore a primary object of the present invention is to provide a livestock watering tank having a float such that its buoyancy can be adjusted.

A further objective of the present invention is to provide a livestock watering tank having a float that can be submerged by a minimum amount of effort by the animal for access to the drinking water.

A further objective of this invention is to provide a livestock watering tank having an economical, efficient, convenient, and durable device to keep the liquid from freezing in subfreezing air.

SUMMARY OF THE INVENTION

The livestock watering tank of the present invention includes a top, bottom and side walls. The top has an opening extending therethrough. A buoyant float generally spherical closes the opening. The float can be submerged by a downward force applied from the head of an animal seeking a drink of water. The float generally has a hollow core and an opening for introducing a substance into the core so that the float's buoyancy can be nearly neutralized with respect to water. The decrease in the float's buoyancy allows an animal to apply a minimal force to submerge the float while maintaining the float's anti-freezing properties.

BRIEF DESCRIPTION OF THE DRAWINGS

FIG. 1 is a perspective view of the livestock watering tank having one water-access opening covered by the float of the present invention.

FIG. 2 is an elevational-sectional view of the tank of FIG. 1 taken along line 2—2.

FIG. 3 is a top view of the tank.

FIG. 4 is a sectional view of the spherical float with a substance introduced into its hollow core.

DETAILED DESCRIPTION OF THE EMBODIMENT

Figure 5:
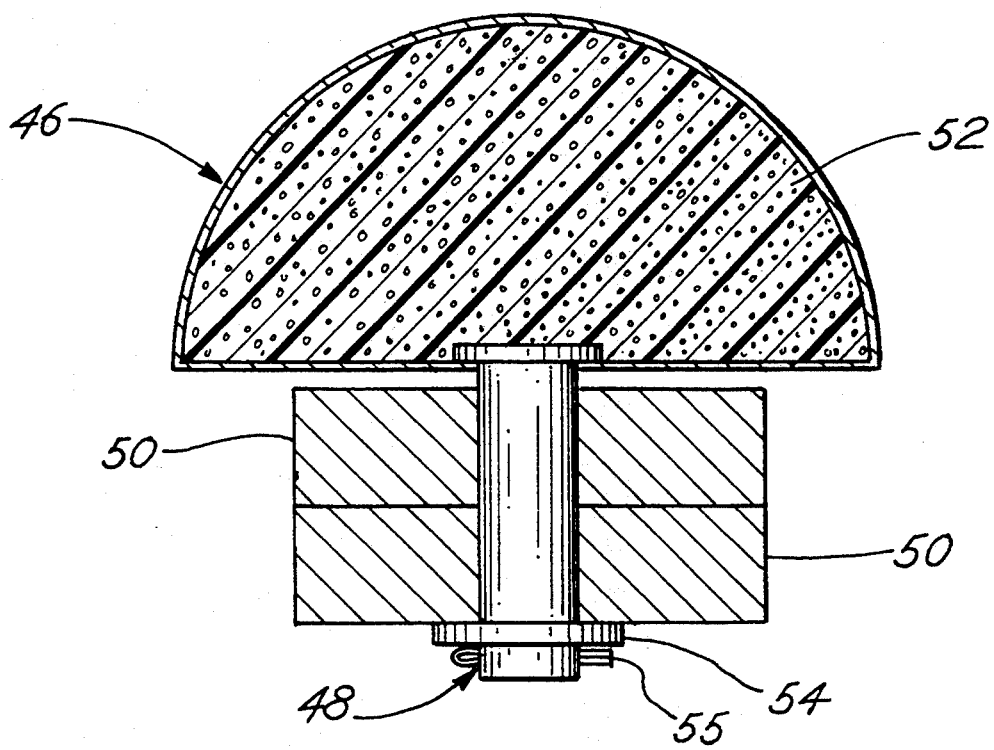
FIG. 5 is a vertical sectional view of a float with exterior weights.

The preferred embodiment herein described is not intended to be exhaustive or to limit the invention to the precise form disclosed. It is chosen and described to illustrate the principles of the invention and its application and practical use to enable those skilled in the art to follow its teachings.

The livestock watering tank 2 includes a top 4, a bottom 6, and an enclosing sidewall 8. Each of the top, bottom and sidewall is of double-walled construction so as to have interior and exterior surfaces and is filled with an insulative material 36. Sidewall 8 is integrally formed with bottom 6, while top 4 can be removed from sidewall 8 if necessary, such as for repair or filling of float 14.

Top 4 of tank includes one or more openings 10 which provide access to the water contained within the tank 2. If desired the tank can be formed to accommodate a single water-access opening, such as seen in U.S. Pat. No. 4,559,905. The perimeter of each opening 10 is defined by a curved vertical wall 12 extending through top 4 and terminating in a lower beveled edge 16.

Each opening 10 is normally closed by a buoyant float 14 shown spherical and designed to thermally seal the opening. Float 14 is constructed of a lightweight material 18 having a hollow core 22. The water level in tank 2 is maintained at a sufficient level by a float operated valve system to force float 14 into peripheral engagement with bevelled edge 16 of its mating opening 10. The tank includes a drain 24 with a removable plug 28 used when cleaning the tank.

Each float 14 has a hole 20 closed by a removable plug 21. Preferably, a closed-cell expandable insulating foam 38 generally composed of urethane is introduced into the ball float where it adheres to the upper inner surface 44 of the ball float 14. A weighted material or substance 42 such as water or sand is introduced into the float's hollow core 22 through hole 20 with plug 21 removed. Hole 20 is located at the bottom of the ball float when the float is placed in the watering tank due to the weight of substance 42 in the float. The amount of substance 42 contained in the float 14 varies inversely with the float's buoyancy. Hence, the float's buoyancy can be nearly neutralized with respect to the water within tank 2 so that an animal need only use a minimal amount of force to push the float 14 down to get a drink of water. As an animal pushes a float 14 downward with his mouth or snout, the float moves out of engagement with bevelled edge 16 and away from the opening to expose the water for drinking. When the animal finishes drinking and releases the float, the buoyancy of the float causes it to return to its closed position, thermally sealing tank opening 10.

In an alternative embodiment, the float 46 shown in FIG. 5 is semi-spherical and composed of a solid buoyant material 52 such as polystyrene without a hollow core. A leg 48 protrudes from the bottom of the float 46 and has weights 50 attached to the leg 48 and held in place by a washer 54 and cotter pin 55 to neutralize its buoyancy with respect to the water.

A float valve (not shown but which may be of the type disclosed in U.S. Pat. No. 4,559,905) located within the float valve chamber 34 supplies additional water from an exterior water supply to raise the water level in tank 2 after an animal drinks.

It is understood that the above description does not limit the invention to the given details, but may be modified within the scope of the appended claims.

What I claim is:

1. A livestock watering tank comprising:
   a tank for receiving water from a water source, such tank including a top wall, an opening extending through said top wall for access by the mouth of said livestock, a float located under said top wall sealing said opening, means for neutralizing the buoyancy of the float relative to the water so that only a minimum amount of downward force need be applied by the livestock with its said mouth to submerge said float and thereby expose said opening to allow access to water for drinking by the livestock, said float having a hollow core, said means for neutralizing the buoyancy of said float including weighted material introduced within said hollow core, said float including port means for introducing said weighted material into said core, said weighted material introduced into said float being a liquid.

2. The tank in claim 1 wherein said liquid is water.

3. A livestock watering tank comprising:

a tank for receiving water from a water source, such tank including a top wall, an opening extending through said top wall for access by the mouth of said livestock, a float located under said top wall sealing said opening, means for neutralizing the buoyancy of the float relative to the water so that only a minimum amount of downward force need be applied by the livestock with its said mouth to submerge said float and thereby expose said opening to allow access to water for drinking by the livestock, said float having a hollow core, said means for neutralizing the buoyancy of said float including weighted material introduced within said hollow core, said float including port means for introducing said weighted material into said core, said core being partially filled with a solid bouyant material located oppositely of said port means.

4. The tank of claim 3 wherein said buoyant material is an insulative material.

5. The tank of claim 3 wherein said port means includes a removable plug.

6. The tank in claim 5 wherein said float core is partially filled with said weighted material.

7. The tank in claim 6 wherein said weighted material is water.

* * * * *